Nov. 17, 1925.  E. M. BUNCE  1,562,287
VEHICLE WHEEL
Filed Sept. 3, 1924
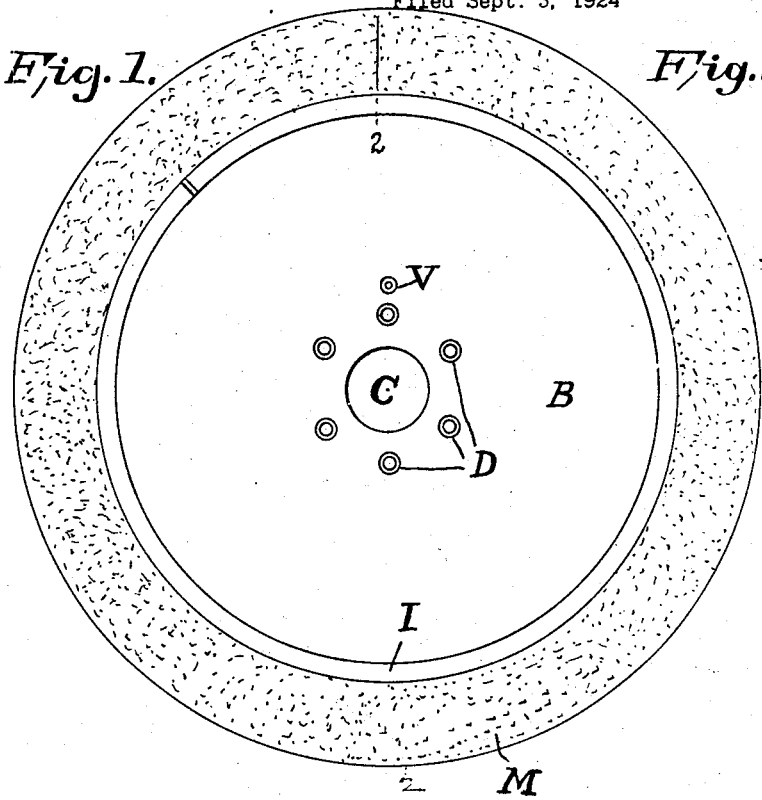
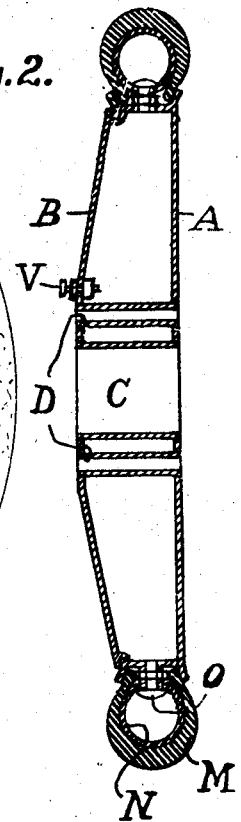
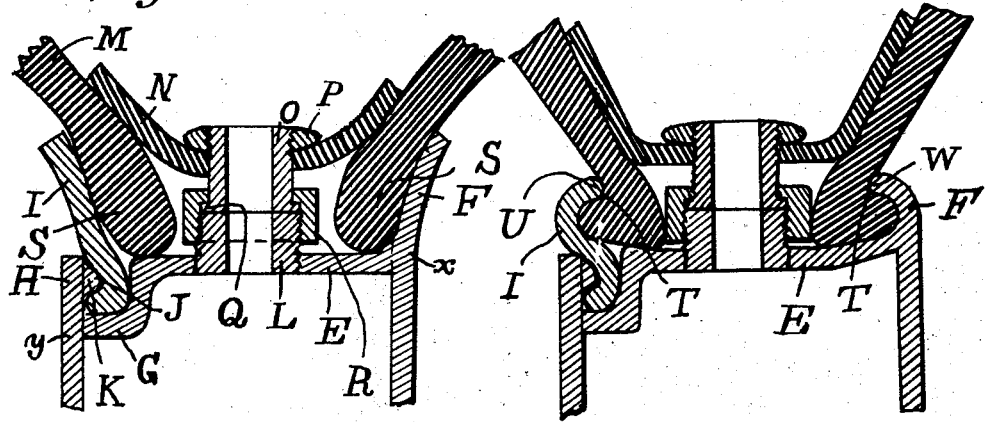
Inventor
E. M. Bunce,
By F. E. Stebbins,
Attorney Patented Nov. 17, 1925.

1,562,287

UNITED STATES PATENT OFFICE.

EARL M. BUNCE, OF FENTON, MICHIGAN.

VEHICLE WHEEL.

Application filed September 3, 1924. Serial No. 735,621.

*To all whom it may concern:*

Be it known that I, EARL M. BUNCE, a citizen of the United States, residing at Fenton, in the county of Genesee and State of Michigan, have invented certain new and useful Improvements in Vehicle Wheels; and I do hereby declare the following to be a full, clear, and exact description of the invention, such as will enable others skilled in the art to which it appertains to make and use the same.

The object of the invention is the production of a practical and commercially efficient wheel constructed with an air chamber between the hub and rim and normally in open communication with the interior of the inner tube of the tire, said air chamber and inner tube being adapted to hold compressed air, whereby the cushioning capacity and resiliency of the wheel shall relatively be much increased.

Attempts have been made to produce a wheel of this general type but owing to improper construction and design and other reasons none of them have been satisfactory for successful use and commercial adoption.

My invention consists in certain novelties of construction and in the combination of parts, as herein set forth, whereby an efficient and practical wheel of this type is provided for use in connection with automobiles, and wherein the imperfections appertaining to other designs for a like purpose are eliminated.

The accompanying drawing illustrates one complete example of the embodiment of the invention and a modification, constructed and the parts combined according to the best modes of procedure I have so far devised for the purpose.

Figure 1 is a side view in elevation of the improved wheel.

Fig. 2 is a vertical section of Fig. 1 taken on line 2—2.

Fig. 3 is an enlarged view in section of part of the tire casing, inner tube, and outer edge of the body of the wheel, also showing the means for forming an open passage for air between the air chamber in the wheel body and the interior of the inner tube.

Fig. 4 is a view similar to Fig. 3 showing a modification.

Referring to Figs. 1, 2 and 3, A designates the inside metallic plate of the wheel body disposed in a vertical plane and having a central opening; B, the outside metallic plate fashioned to a dished-shape and having a central opening, as shown; C, a cylindrical spacing tube between the two plates, in line with the openings therein and welded to both plates forming air tight connections; D, spacing tubes having their ends located within openings in the plates and welded to the metal of the plates, said tubes being open at the ends to receive bolts by which the hub of the wheel is secured to the plates; E, the circular metallic rim of the wheel; F, the upwardly and outwardly extended circumferential edge of the rim forming a bearing for the tire casing; G, the downwardly extended opposite edge of the rim forming with the upwardly or outwardly projecting edge H of the plate B a recess or seat for a detachable holding ring I which secures the casing in position; J, a circular recess in the ring I which matches and provides for the frictional interlocking of the ring with a circular projection K at the inner surface of the projecting edge H of the plate B, said ring I being split so it may be expanded and detached from the rim proper of the wheel; L, an externally threaded nipple secured in the rim; M, the tire casing; N, the inner tube; O, a cylindrical tube, having a top flange P and a bottom flange Q, located within an opening in the inner tube; R, a threaded clamping or coupling nut for forcing the edges of tube O and nipple L together and forming an air tight joint; and S, S, designate the thickened edges of the casing M.

The rim E is welded to the plate A at the point *x* throughout its circumferential edge and the edge G is similarly welded to the plate B at the point *y*, thus forming an air tight chamber within the body of the wheel, bounded by the two plates, the spacing tube C, and the rim. Any suitable valve, as V, is provided for the introduction of air to the air chamber and the interior of the inner tube.

Obviously, the air under compression within the inner tube holds the casing in position. When the air chamber and inner tube are deflated detachable ring I may be removed and the casing detached, or edge of the casing turned up, providing access to the clamping or coupling nut R, which when unscrewed from the nipple L permits the removal of the inner tube.

While only one communicating passage is shown between the air chamber and the interior of the inner tube, several may be provided, two at least being desirable, disposed at opposite sides of the wheel.

The modification, Fig. 4, shows the circumferential edges of the casing with recesses T, T, within which are seated the inwardly turned edges U of the ring I and W of the wheel rim E, which arrangement in some cases may be deemed advisable.

From the foregoing description taken with the drawing it will be clear that I have provided a wheel of the type hereinbefore mentioned which is practical and efficient for the purpose intended.

What I claim is:

1. The combination in a wheel, of two circular metallic plates, each plate having a central opening; a spacing member, having an opening therethrough uniting said plates in line with the central openings therethrough and forming air tight connections with said plates; a circular metallic rim welded to the outer edges of said plates forming with said plates and spacing member a closed air chamber; a tire, including an inner tube, at the outer surface of the rim; coupling means secured to the inner tube and also to the rim for forming an open passageway between the interior of the inner tube and the air chamber in the body of the wheel; a valve for the introduction of air to the air chamber and the inner tube; and means at the outer edges of the rim for retaining the tire in position when the tire is inflated.

2. The subject matter of claim 1 wherein the means for retaining the tire in position when inflated consists of a circumferential upward extension from the rim at one edge thereof and a removable ring at the opposite edge of the rim.

3. The subject matter of claim 1, wherein the means for holding the tire in position consists of a circumferential upwardly projecting part, as F, at one edge of the rim, an extension, at the opposite edge of the rim, and a split ring.

4. The subject matter of claim 1, wherein the means for forming an open passageway between the interior of the inner tube and the air chamber in the wheel body consists of a detachable coupling.

5. The subject matter of claim 1, wherein the means for forming an open passageway between the inner tube and air chamber in the body of the wheel consists of a detachable coupling access to which is permitted only when the tire is deflated.

6. The subject matter of claim 1, wherein the body of the wheel is provided with a series of air tight open ended tubes to receive bolts for securing a spacing member in position.

7. The combination in a wheel, of two circular metallic plates, each plate having a central opening; a spacing member, having an opening therethrough to receive a hub, uniting said plates in line with the central openings therethrough and forming air tight connections with said plates; a circumferential rim secured to the outer edges of the said plates forming with said plates and spacing member a closed air chamber; an air tight tire at the outer periphery of said rim; coupling means for forming an open passageway between the interior of the tire and the air chamber in the wheel, said means being secured to the rim and to the tire whereby the tire is anchored to the said rim; and an air valve for the admission of air to the tire and air chamber in the wheel.

8. The combination with a wheel body having an air tight chamber formed by two metallic plates, a spacing member at the center, and a rim, a detachable holding ring I, a casing, an inner tube within the casing, and coupling means connecting the inner tube and rim forming an open passageway between the interior of the tube and the air chamber in the body of the wheel.

9. A pneumatic wheel comprising a spacing member having an opening, a rim, a casing on the rim, disks connecting the spacing member and rim and forming an air chamber adapted to contain compressed air, a pneumatic tube mounted in the casing on said rim, the rim and tube having aligned openings, and a coupling located within said openings and detachably secured to the tube and also to the rim.

In testimony whereof I affix my signature.

EARL M. BUNCE.